(No Model.)
M. STONE.
DISH WASHER.
No. 467,444.   Patented Jan. 19, 1892.
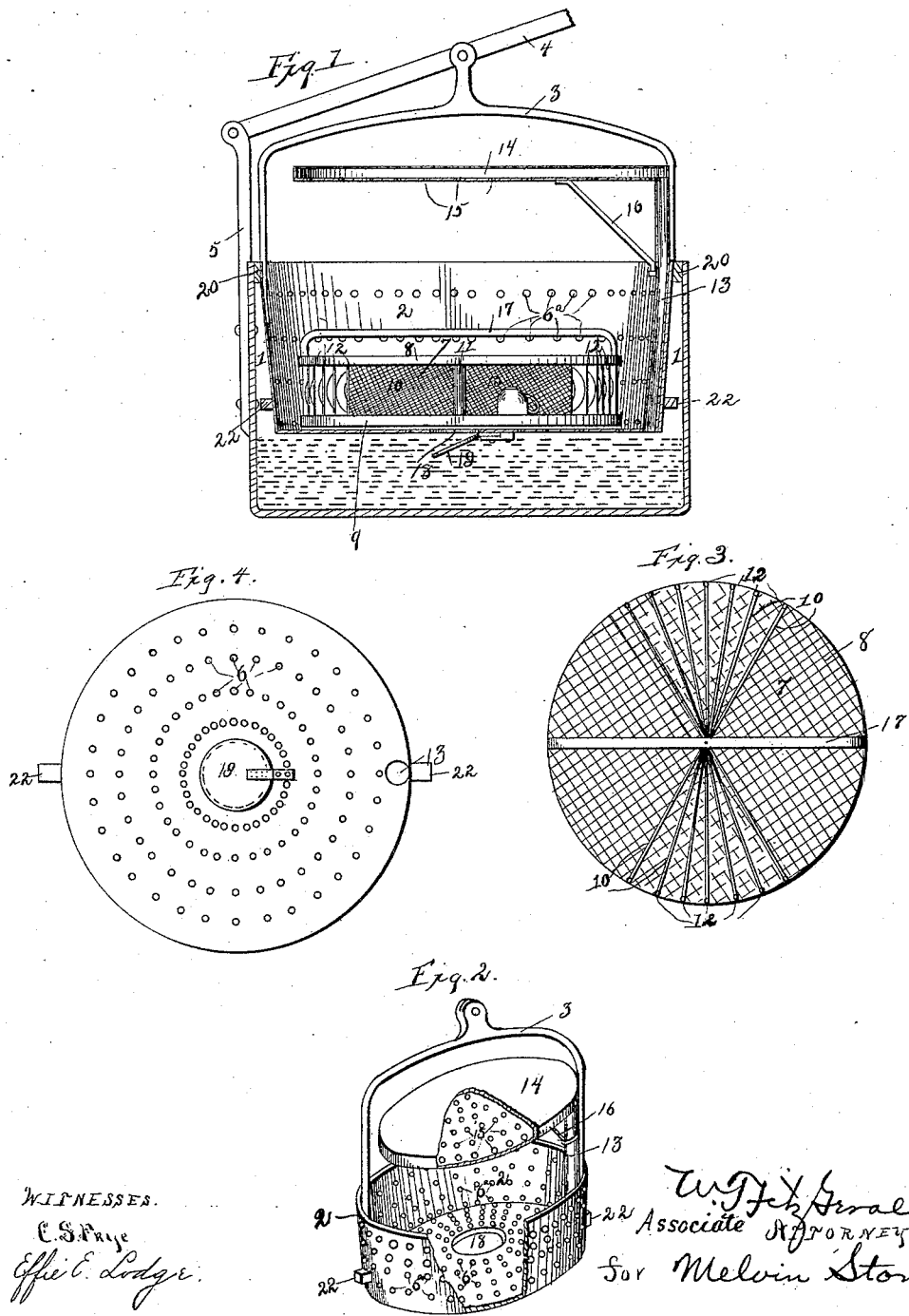

UNITED STATES PATENT OFFICE.

MELVIN STONE, OF FALLBROOK, CALIFORNIA.

DISH-WASHER.

SPECIFICATION forming part of Letters Patent No. 467,444, dated January 19, 1892.

Application filed February 24, 1891. Serial No. 382,526. (No model.)

*To all whom it may concern:*

Be it known that I, MELVIN STONE, a citizen of the United States, residing at Fallbrook, in the county of San Diego and State of California, have invented certain new and useful Improvements in Dish-Washers; and I do hereby declare the following to be a full, clear, and exact description of the invention, such as will enable others skilled in the art to which it appertains to make and use the same.

My invention consists in a new and improved dish-washing machine by means of which a large number of dishes, cups, &c., can be readily, easily, and thoroughly cleaned in a few minutes, requiring only a few moments' labor to effect this result, and the invention will be hereinafter fully described and claimed.

Referring to the accompanying drawings, Figure 1 is a vertical sectional view of my new and improved dish-washing machine. Fig. 2 is a perspective view, partly in section, of the movable receptacle which reciprocates up and down within the outer receptacle 1. Fig. 3 is a top plan view of the cage in which the plates and cups are held while being cleaned. Fig. 4 is a bottom plan view of the cage which is shown in perspective in Fig. 2.

The same numerals of reference indicate corresponding parts in the several figures.

Referring to the several parts by their designating-numerals, 1 indicates the outer vessel or receptacle, which may be made of any size, according to the capacity of the proposed machine.

2 indicates the movable receptacle which fits within the outer vessel 1 and is reciprocated up and down within the same. This inner vessel is provided with the curved handle 3, having a central projection, which is pivoted to the operating-lever 4. To one side of the outer receptacle 1 is bolted a standard 5, to the upper end of which the end of the lever 4 is pivoted, the other end of the lever being rounded to form a convenient handle. The bottom of the inner vessel 2 is formed with a series of perforations 6, and its sides are formed with a series of perforations 6ª.

7 indicates the cage or basket in which the dishes and cups to be washed are placed. This basket is formed with the parallel top and bottom 8 9, which may be formed either of perforated sheet metal or, preferably, of wire-gauze, the edges of which are secured to metal rings of suitable strength. This latter construction is preferred, and is illustrated in the drawings. Between the top and bottom of the cage racks 10 are fitted, which are formed of wire-gauze and are arranged radially, with their inner ends secured to a center post 11, while their outer ends are secured to the vertical brace-rods 12, which form the outer ends of the racks, and also serve to brace and strengthen the entire frame of the cage.

At one side of the vessel 2 is formed an upright pipe 13, which is open at its lower end and communicates at its upper end with the spraying pipe or chamber 14, which extends, as shown, horizontally over the top of the vessel 2. The lower side of this pipe or chamber is formed with a series of perforations 15 and is braced or supported by an inclined brace 16.

The cage 7 is provided with a convenient handle 17, by means of which it can be readily placed in position on the bottom of the vessel 2 and conveniently removed after the dishes have been cleaned.

In operation the bottom of the outer vessel 1 is filled with hot water, and the cups and dishes having been placed in the cage 7 the latter is set in position on the bottom of the vessel 2. By working the handle 4 up and down the receptacle 2 is reciprocated up and down and the hot water will enter through the perforations 6 6ª in the bottom and sides of the vessel 2 and be forced through the perforated bottom of the cage. At the same time, as the vessel 2 is reciprocated the hot water in the receptacle 1 will be forced up through the pipe 13 into the spraying device 14 and be discharged through the numerous perforations 15 down upon the open top of the cage between the plates and cups contained within the same. The bottom of the vessel 2 is formed with the central opening 18, which is controlled by a downwardly-opening valve 19, so that as the vessel is pressed down in the water contained in the lower part of the receptacle 1 this valve will be closed by the pressure of the water, while when the vessel 2 is raised the valve 19 will open to permit the water, which has passed through the cage, to escape back into the bottom of the receptacle 1 through the opening 18.

A packing 20 is secured around the inner upper edge of the outer receptacle 1 to prevent the water from splashing out or escaping over the edge of the receptacle 1 when the vessel 2 is reciprocated downward in the same. The vessel 2 may be formed with the outer guide-lugs, which fit and slide in between cleats 22 for the purpose of guiding or steadying the vessel 2 in its movement within the outer receptacle 1.

From the foregoing description, taken in connection with the accompanying drawings, the great utility and convenience of my invention will be readily perceived. It will be seen that a large number of dishes, cups, &c., can be placed within the cage 7, which is then set in the vessel 2, (the hot water having been previously placed in the outer receptacle,) and by operating the handle 4 for a few minutes the hot water will be forced between and around the vessels within the cage and also sprayed down from the device 14 through the open top of the cage, thus effectually cleaning the dishes, &c., in a few minutes' time and with a minimum of labor.

Having thus described my invention, what I claim, and desire to secure by Letters Patent, is—

1. The combination of the outer receptacle 1, the inner vessel 2, formed with the series of perforations and having the bottom opening 18, controlled by a downwardly-opening valve, the perforated cage adapted to contain the cups and saucers and to fit within the inner vessel 2, and the operating-lever pivoted to a standard on the outer vessel and pivotally connected with the inner vessel 2, substantially as set forth.

2. The combination of the outer receptacle 1, having the standard 5, the inner vessel 2, having the handle 3 and formed with the perforated bottom and sides, the pipe 13, the spraying device 14, communicating with said pipe and arranged horizontally above the top of the vessel 2, and the operating-lever pivoted to the standard 5 and to the handle 3 of the inner vessel, substantially as set forth.

3. The combination, with an outer receptacle and a perforated inner receptacle reciprocating within the same, of the cage formed with the perforated top and bottom 8 9, the central post 11, and the radial perforated racks 10, substantially as set forth.

4. In a washing-machine, the combination of the outer receptacle having the packing-ring 20 at its upper end, the perforated vessel 2, formed with the central opening controlled by the downwardly-opening valve, the pipe 13, the spraying device 14, communicating with the upper end of the same, and the perforated removable cage 7, substantially as set forth.

In testimony whereof I have affixed my signature in presence of two witnesses.

MELVIN STONE.

Witnesses:
A. B. SMITH,
JOHN R. CHAMBERLIN.